Dec. 18, 1934.  H. A. STAPLES  1,984,553
FLEXIBLE ELECTRIC CONDUCTOR
Filed July 17, 1931
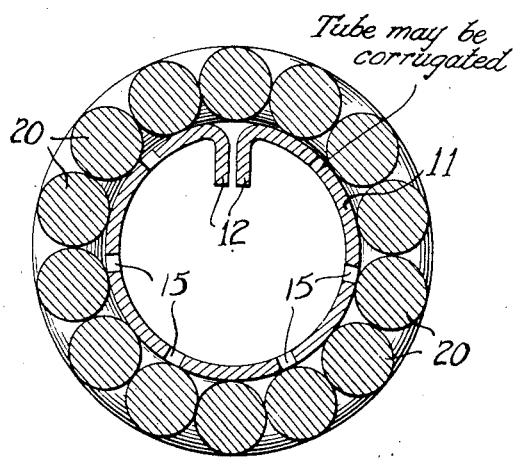
INVENTOR
Horace A. Staples
BY
ATTORNEY Patented Dec. 18, 1934

1,984,553

UNITED STATES PATENT OFFICE 1,984,553

FLEXIBLE ELECTRIC CONDUCTOR

Horace A. Staples, Plainfield, N. J., assignor to Phelps Dodge Copper Products Corporation, New York, N. Y., a corporation of Delaware Application July 17, 1931, Serial No. 551,422

7 Claims. (Cl. 173—13)

My invention relates to electrical conductors and more particularly to a flexible electrical conductor cable designed for the transmission of electrical power by means of very high voltages.

It has been well known to those skilled in the art, for a long period, that when a voltage exceeds a certain critical value for a conductor of a certain diameter, the air in the vicinity of the wire commences to break down and electricity leaks from the cable into the surrounding air, thereby producing a loss of power.

This is known as corona loss. To reduce the corona losses, it is desirable to have cables of large diameter. This is prohibitive from not only cost but because of excessive weight and therefore several types of hollow conductors have been designed and used to overcome this disadvantage. All these hollow conductors, however, have certain inherent defects, some of which are difficulties experienced in making joints and the splicing of two cables together.

One of the objects of this invention is to provide a cable that is economical in construction and one that presents no difficulties in making joints. It will be observed that with this construction there will be no inner section or core to be removed and that the full strength of the core can be utilized as a part of the completed cable.

A further object is to provide a core that will have the maximum strength for a minimum weight and because of full support for the outer surface of high electrical conductivity these outer strands can be made of much larger wires than found in the ordinary hollow cable.

I am aware that open seamed tubes have been used for inner cores before, but it was necessary to make the core of very heavy gauge to overcome the slipping by the adjacent edges.

The foregoing and other features of my invention will now be described in connection with the accompanying drawing forming part of this specification in which I have represented my hollow core cable in its preferred form after which I shall point out in the claims those features which I believe to be new and of my own invention.

In the drawing:

The figure is a cross-section of my cable.

In carrying out my invention I provide a thin wall tube 11 for a hollow core over which a plurality of wires 20 are stranded in a common accepted form.

In making the core 11 I may use a thin strip of metal preferably copper, although it may be a lighter alloy depending upon the special requirements. This strip of metal is formed by a series of rolls separately from the standing operation, or incident with it, into a tube with internal flange 12 facing each other. The objects of these flanges is to prevent the edges of the tube sliding by each other thus causing collapse. This also permits the use of very much thinner metal. For certain types of installation the metal may be corrugated to allow for expansion.

With this construction the thin walled tube may be made lighter, which gives greater amount of elongation to prevent the breaking under strain prior to the failure of the outer wires.

The inner tube 11 is punched with holes 15 simultaneous with the operation of forming the tube to allow for drainage of water.

I wish it distinctly understood that my hollow core cable herein described and illustrated is in the form in which I desire to construct it and that changes or variations may be made as may be desirable without departing from the salient features of my invention and I therefore intend the following claims to cover such modifications as naturally fall within the lines of invention.

I claim:—

1. In a flexible conductor cable having a large overall cross sectional area relative to its metallic area, a core comprising an open longitudinal seamed tube having the edges of the seam turned inwardly to form abutting flanges to prevent the tube from collapsing under circumferential compression.

2. The device of claim 1 including means to provide for the drainage of water from within the hollow core.

3. The device of claim 1 in which the wall of the tubes is thin and corrugated.

4. A flexible conductor cable having a large overall cross sectional area relative to its metallic area and including a core of thin walled open seamed tubing having its edges of the seam turned inwardly to form abutting flanges to prevent the tube from collapsing under circumferential compression, an annular outer stranded surface the strands being in contact with the core throughout their entire length.

5. A flexible conductor of the class described in combination, a hollow core comprising an open seam tube having its longitudinal edges turned inwardly so that they abut only when radial stresses are exerted on the core, and an annular outer surface of high electric conductivity comprising a plurality of individual conductors stranded thereon.

6. The device of claim 5 in which the stranded wires of the outer surface are laid helically upon said core.

7. A flexible conductor of the class described in combination, a hollow core comprising an open seam tube the edges of the longitudinal seam turned inwardly but not touching, and an annular outer surface of high electric conductivity stranded thereon, the edges of the seam so arranged that they cannot slip by each other thereby preventing the tube from collapsing under circumferential compression.

HORACE A. STAPLES.